(12) United States Patent
Stumpf et al.

(10) Patent No.: US 7,969,316 B2
(45) Date of Patent: Jun. 28, 2011

(54) CHILD LEG MONITORING SYSTEM AND METHOD

(76) Inventors: John Stumpf, Phoenix, AZ (US);
Laurie Stumpf, Phoenix, AZ (US)

( * ) Notice: Subject to any disclaimer, the term of this patent is extended or adjusted under 35 U.S.C. 154(b) by 314 days.

(21) Appl. No.: 12/284,687

(22) Filed: Sep. 24, 2008

(65) Prior Publication Data

US 2009/0091459 A1 Apr. 9, 2009

Related U.S. Application Data

(60) Provisional application No. 60/977,951, filed on Oct. 5, 2007.

(51) Int. Cl.
*G08B 23/00* (2006.01)
*G08B 21/00* (2006.01)
(52) U.S. Cl. .................... 340/573.1; 340/573.7; 340/540
(58) Field of Classification Search .......................... None
See application file for complete search history.

(56) References Cited

U.S. PATENT DOCUMENTS

| | | | | |
|---|---|---|---|---|
| 5,838,240 A * | 11/1998 | Johnson | .................. | 340/604 |
| 5,929,782 A * | 7/1999 | Stark et al. | ............... | 340/870.01 |
| 6,031,463 A * | 2/2000 | Bechmann | .................... | 340/666 |
| 6,129,686 A * | 10/2000 | Friedman | ...................... | 600/595 |
| 6,267,730 B1 * | 7/2001 | Pacunas | ........................ | 600/534 |
| 6,377,178 B1 * | 4/2002 | DeToro et al. | ............. | 340/573.1 |
| 7,029,066 B1 | 4/2006 | Myers-Jones | | |
| 7,100,982 B2 | 9/2006 | Lundgren | | |
| 2003/0067390 A1* | 4/2003 | Fitzgerald et al. | .......... | 340/573.1 |
| 2007/0200714 A1* | 8/2007 | Smith et al. | ................ | 340/573.1 |
| 2007/0252711 A1* | 11/2007 | Long et al. | ................. | 340/573.5 |
| 2008/0258921 A1* | 10/2008 | Woo et al. | .................. | 340/573.1 |
| 2009/0105785 A1* | 4/2009 | Wei et al. | ...................... | 607/48 |
| 2009/0227925 A1* | 9/2009 | McBean et al. | ................. | 602/16 |
| 2009/0318802 A1* | 12/2009 | Boyden et al. | ................ | 600/437 |

* cited by examiner

*Primary Examiner* — Julie Lieu

(57) ABSTRACT

A monitoring system for use with a leg hole device includes a sensor for monitoring a state of at least one leg of a child engaged with the leg hole device, a control system, and a user interface. A state of presence or absence of at least one leg may be monitored.

18 Claims, 8 Drawing Sheets

CHILD LEG MONITORING SYSTEM AND METHOD

CROSS-REFERENCE TO RELATED APPLICATIONS

This application claims priority to U.S. provisional application Ser. No. 60/977,951, filed Oct. 5, 2007, entitled CHILD LEG WARNING SYSTEM AND METHOD which application is incorporated herein by reference.

BACKGROUND

Certain devices include holes, slots or other features for legs of a child, for example, shopping carts, highchairs, car seats and strollers. As used herein, such devices shall be referred to as leg hole devices ("LHDs"). When a child is engaged with a LHD, the child typically removes his or her legs from the holes of the LHD to stand upon a seat or other feature of the LHD. In many situations, a LHD has straps, belts or other devices forming a harness which holds a child in place. However, it may be inappropriate to rely solely on such harnesses since harnesses can fail in LHDs, buckles, snaps and other features of a harness can be opened by children, caregivers can forget to secure any buckles or snaps and children can wiggle out of a harness. Moreover, caregivers often concentrate on other tasks at least briefly when a child is in a LHD, such as, for example, watching another child, getting groceries off a shelf, cooking food, getting food from a refrigerator, operating a motor vehicle and the like. In such situations, caregivers may need to focus on these other tasks while a child is in an LHD, thereby potentially leaving the child in danger.

SUMMARY

In an embodiment, a monitoring system for use with a leg hole device is provided. The monitoring system has a sensor for monitoring a state of at least one leg of a child engaged with the leg hole device. A control system is coupled with the sensor and a user interface for configuring the monitoring system is operably coupled with the control system. A state of presence or absence of at least one leg may be monitored.

In an embodiment, a monitoring system for use with a leg hole device has a one or more sensors which may be of the following types: radio frequency sensors, active infrared sensors, passive infrared sensors, capacitive sensors, acoustic sensors, photoelectric sensors, fiberoptic sensors, electric field imaging sensors, ultrasonic transducers and optoelectronic sensors.

In an embodiment, a monitoring system for use with a leg hole device has an indicator which provides audible indications, visual indications, vibratory indications, mechanical indications, electrical indications, radio-transmitted indications and/or remote indications of a monitored state.

In an embodiment, a method monitors a child engaged with a leg hole device, including: activating a monitoring system, monitoring a state of at least one leg of the child and providing an indication of the state of the at least one leg of the child.

In an embodiment, a monitoring system for use with a leg hole device has an infrared sensor for monitoring a state of at least one leg of a child engaged with the leg hole device. A control system is electrically coupled to the sensor and at least one control for configuring said monitoring system is operably coupled with the control system.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION OF ILLUSTRATED EMBODIMENTS

To overcome the shortcomings of prior art systems, the present invention generally includes a system and method for monitoring a state of presence or absence of at least one leg of a child engaged with holes, slots or other features of a LHD and may provide an indication of a monitored state to a caregiver, any desired third party or a separate system.

Figure 1:
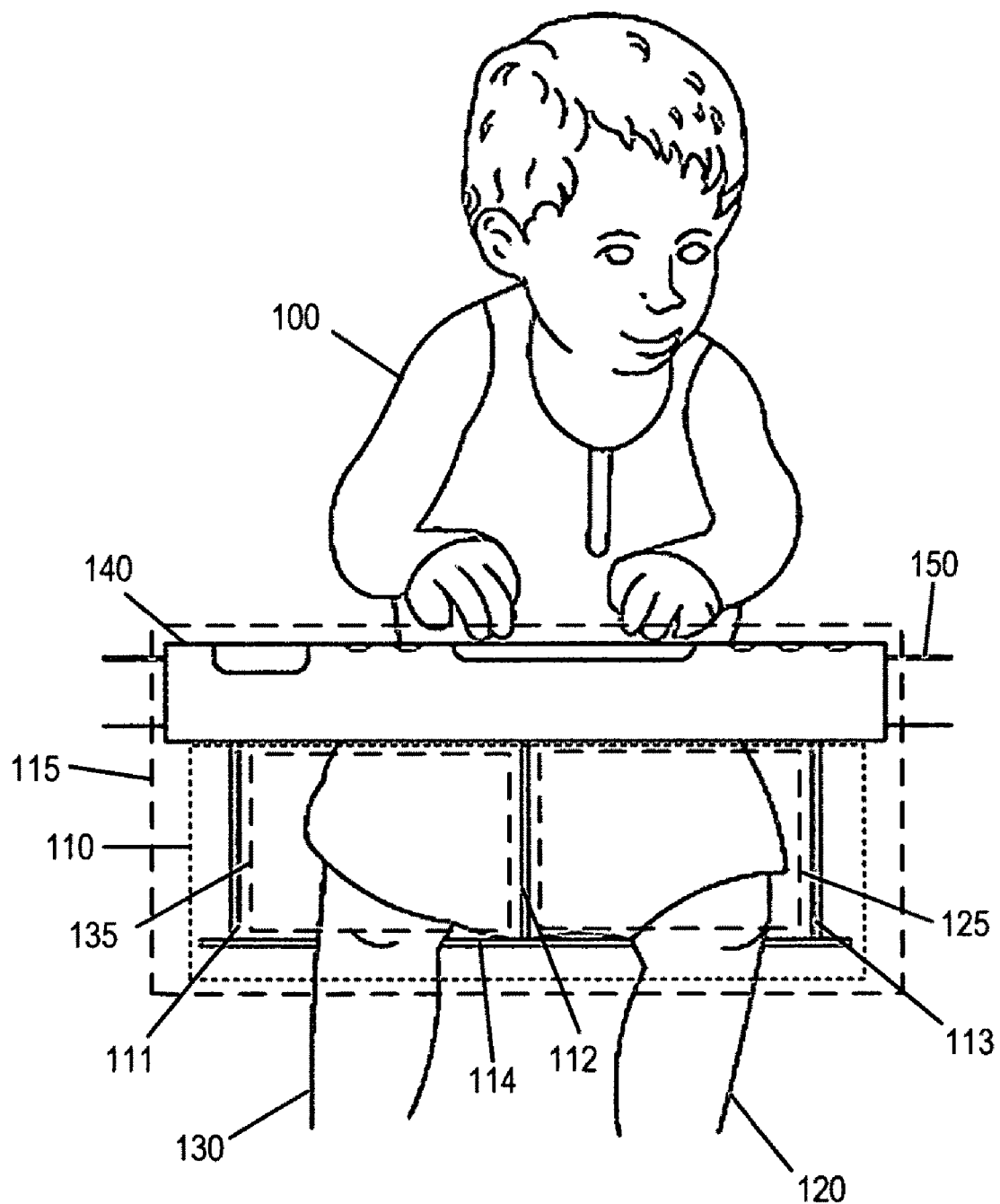
FIG. 1 is a front view of a child engaged with a LHD incorporating a monitoring system, in accordance with an embodiment.

FIG. 1 shows a front view of child 100 engaged with LHD 110 and monitoring system 115. LHD 110 may include one or more vertically-oriented opening defining elements 111, 112 and 113 as well as laterally-oriented seat portion 114. Left leg 120 is engaged with opening 125 and right leg 130 is engaged with opening 135. Control panel assembly 140 is shown connected with support 150 which is a portion of a LHD such as a carrying handle or movable encapsulation arm of a car seat, a tray of a highchair or a handle of a shopping cart. Control panel assembly 140 may include a plurality of controls, buttons, indicators and other features which define a user interface operably coupled with a control system for configuring monitoring system 115. Monitoring system 115 may be fully contained with control panel assembly 140 or may contain additional elements as discussed herein below. Additionally or optionally, a user interface may be remote from control panel assembly 140 on a remote device as discussed below.

Figure 2:
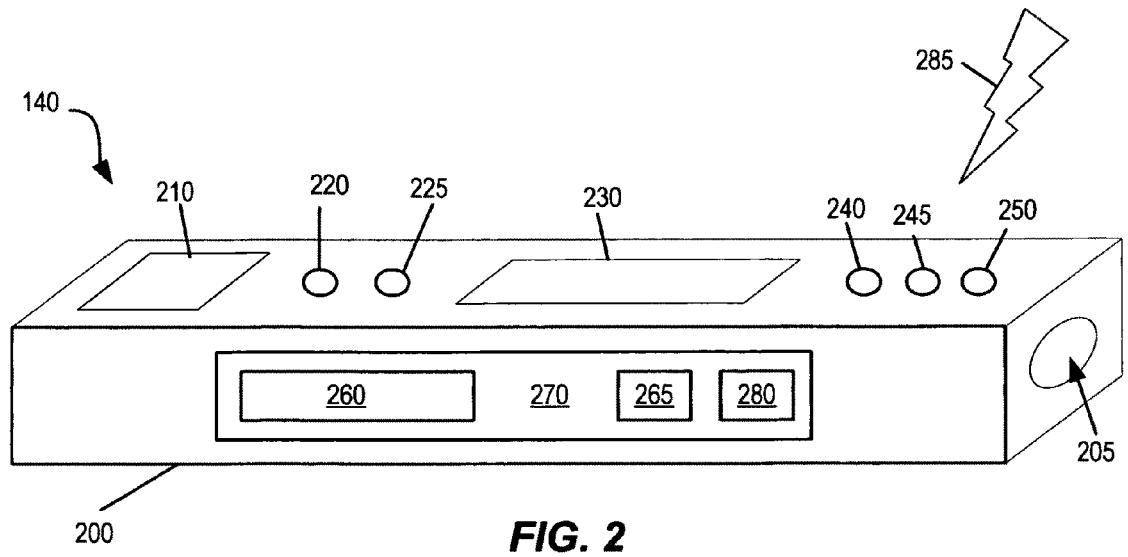
FIG. 2 is a three dimensional view of a control panel assembly for a monitoring system, in accordance with an embodiment.

FIG. 2 shows a three dimensional view of control panel assembly 140 of FIG. 2 which may include housing 200, audible indicator 210, status indicators 220 and 225, display 230 and control buttons 240, 245 and 250. Contained within housing 200 may be a control system such as microprocessor 260 which may be, for example, a PIC microcontroller from Microchip Technology Inc. that is electrically and operationally configured for such tasks as monitoring one or more sensors for a state of absence or presence of at least one leg of a child engaged with a LHD, providing electrical signals to audible indicator 210 and accepting configuration commands from control buttons 240, 245 and 250. Although microprocessor 260 may be employed for use as a control system with certain embodiments of control panel assembly 140, it may be understood by those skilled in the art that discrete logic chips, programmable logic arrays or other electronic circuitry may be used as a control system. Microprocessor 260 and/or other electronic circuitry and power source 265 may be included on printed circuit board ("PCB") 270 enclosed within housing 200. Control panel assembly 140 may also include a RF ID tag (not shown) for identification, tracking or loss prevention. Microprocessor 260 may act as either a passive or interactive control system for a monitoring system such as monitoring system 115. A passive control system may be defined as a system which requires minimal interaction with a user or operator. For example, a passive control system may self-activate/deactivate and/or provide a default monitoring configuration and status indications without user activities. Alternatively, an interactive control system may provide the functionality of a passive control system but may further allow or require user interaction. For example, a monitoring system which is designed to be portable may require a user to adjust a parameter of the monitoring system to different environments. For example a portable monitoring system when used with a shopping cart may provide a visual indication or low intensity audible indication which may be recognized by a caregiver while shopping; whereas, when used with a car seat the same monitoring system may be more usefully be configured to provide a high intensity audible indication which may be recognized above a loud automobile environment.

Housing 200 may be made of a material such as plastic or metal that is suitably adapted in size and shape to fit one or more associated LHDs. For example, housing 200 designed to operate with a shopping cart may be an elongated rectangular or oval shape approximately 6 to 10 inches in length and 1 to 2 inches per side or diameter. Housing 200 may also include features that permit mounting of housing 200 to a portion of a LHD. As shown in FIGS. 1 and 2, control panel assembly 140 and specifically housing 200 is connected with support 150. Support 150 may be of a circular cross-section and relatedly housing 200 may include features, such as circular opening 205 that permit housing 200 to be mounted about support 150.

A monitoring system, such as monitoring system 115 of FIG. 1, may be suitably configured to stand alone and/or be attachable to an LHD. A monitoring system may be integrally formed with a portion of an LHD, such as LHD 110 of FIG. 1. For example, a monitoring system may be integrated with a carrying handle or encapsulation arm (movable arm used to open/close the car seat to allow in/out of child) of a car seat, a tray of a highchair, a top bar of a stroller or a handle of a shopping cart. In another embodiment, a monitoring system may be integrally formed with another item or accessory for a LHD such as a pad or sanitary cover used with shopping carts or other LHDs such as those devices disclosed in, for example, U.S. Pat. Nos. 7,100,982 and 7,029,066, which are hereby incorporated by reference.

Electrical elements of control panel assembly 140 may be powered by power source 265 which may be for example, a replaceable or rechargeable battery, a capacitor or other electrical energy storage device. Power may also be provided by a solar cell or external power supply such as from a wall plug (considering suitable power conversion) or automotive outlet. Power may also be provided via mechanical conversion via a generator or dynamo such as may be attached to a wheel of a shopping cart or provided by a wound spring mechanism. If so equipped, control panel assembly 140 or PCB 270 may include a battery monitor circuit and provide an indication when battery power is low (e.g., audio indication from, for example, audible indicator 210 or visual indication from, for example, status indicator 220 or display 230).

Audible indicator 210 may be, for example, a speaker or piezo device for producing a audible "spoken" message or sound based upon a waveform provided from microprocessor 260. Audible indicator 210 may produce different tones for indicating a state of presence or absence of one or two legs. For example if both legs are present, a low intensity moderate pitch tone may be produced to indicate that a child is fully engaged with a LHD whereas a high intensity and high pitched tone may be produced to indicate that a child may be standing and disengaged with a LHD. Status indicators 220 and 225 may be, for example, single color or multicolored LEDs which may indicate, for example, a status of a state of a child's leg in a LHD or an error state of a monitoring system. Absence or presence of a child's leg may be indicated, for example, by red and green LEDs respectively. An error state of a monitoring system may be indicated by one or more flashing LEDs.

Display 230 may present leg state and/or system error status indications or may provide monitoring system directions, child entertainment or an advertising message. Control buttons 240, 245 and 250 may permit control, operation and configuration of a monitoring system. For example; control button 240 may permit a user to enable or disable power to the monitoring system; control button 245 may provide for adjustment of a configurable monitoring system parameter such as sensitivity to movement or position of a child's leg; and control button 250 may permit activation, deactivation or level adjustment of an audible indication such as from audible indicator 210.

Control panel assembly 140 may also include an RF or IR transmitter/receiver subsystem 280 for transmitting and receiving signals 285 to and from a remote device such as described below in association with FIG. 3. Signals 285 may also be sent to a cell phone, pager, personal digital assistant (e.g., a Blackberry®) and the like.

A monitoring system may provide an indication to a third party upon detecting an inappropriate movement of a monitored child or a monitoring system problem. As used herein, "upon" may include immediate, within a few seconds, within a few minutes, within a predetermined time, for any desired duration and/or any other period. An indication may be sent to a caregiver and/or any other desired, potentially remote, third party such as, for example, the police, ambulance, emergency personnel, neighbor, medical professional and the like. A sent indication may be audible, visual, vibratory, mechanical, electrical, radio-transmitted, or any other indication discussed herein or known in the art. An indication may emanate from control panel assembly 140 and/or from remote 300 of FIG. 3.

Figure 3:
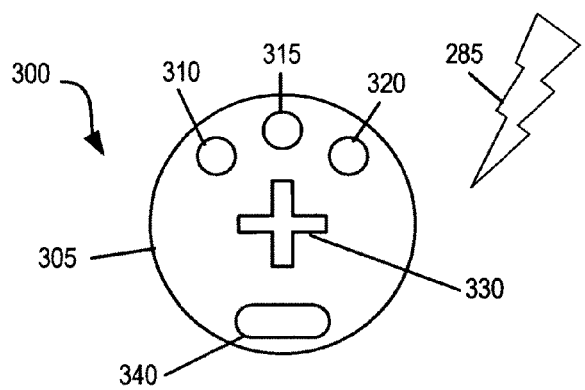
FIG. 3 is a top view of a remote for use with a monitoring system, in accordance with an embodiment.

FIG. 3 shows a top view of remote 300 which may be used with monitoring system 115 of FIG. 1. Remote 300 may be assembled with housing 305 and may include additional features such as visual indicators 310, 315 and 320; control button 330 and audible indicator 340 which define a user interface. Remote 300 may also include an RF or IR transmitter/receiver subsystem (not shown) for transmitting and receiving signals 385 to and from control panel assembly 140 of FIG. 2 or another external device such as mentioned above. Visual indicators 310, 315 and 320 may be, for example, single color or multicolored LEDs which may indicate, for example, a status of a state of a child's leg in a LHD or an error state of a monitoring system such as monitoring system 115 of FIG. 1. Absence or presence of a child's leg may be indicated, for example, by red and green LEDs respectively. An error state of a monitoring system may be indicated by one or more flashing LEDs. Control button 330 may permit control, operation and configuration of a monitoring system such as monitoring system 115 of FIG. 1. Audible indicator 340 may be, for example, a speaker or piezo device for producing a audible message or sound. Remote 300 may be design to be repeatedly attachable and detachable with control panel assembly 140 of FIG. 2 or with some portion of an associated LHD such as a handle of a shopping cart. Remote 300 may also "dock" with control panel assembly 140 for recharging. Remote 300 may be wirelessly connected with control panel assembly 140 or may be wired or otherwise "tethered" with control panel assembly 140 or some portion of an associated LHD.

Figure 4:
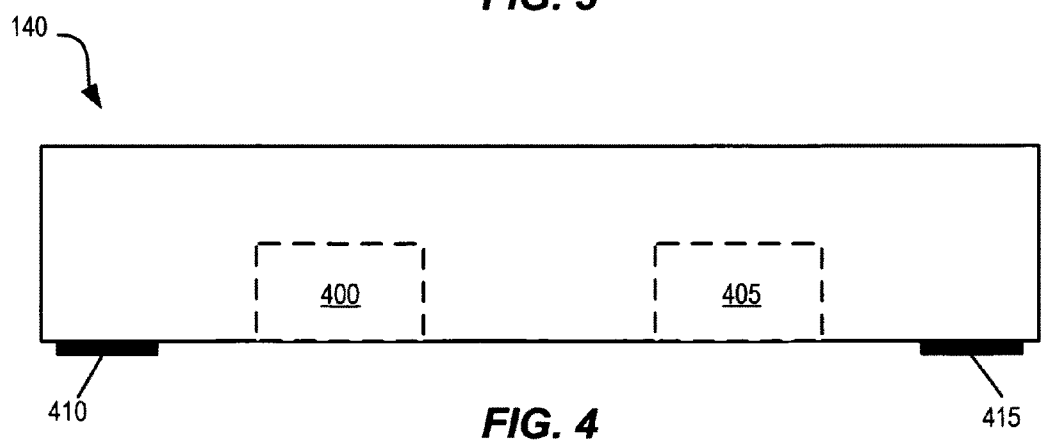
FIG. 4 is a simplified cross-sectional view of control panel assembly 140 of FIG. 2 including sensor subsystems, in accordance with an embodiment.

FIG. 4 shows a simplified cross-sectional view of control panel assembly 140 of FIG. 2. Control panel assembly 140 may include one or more sensor subsystems 400 and 405. Sensor subsystems 400 and 405 may be, for example, associated with monitoring right leg 130 and left leg 120, respectively, of child 100 of FIG. 1. In an embodiment, one class of device that may be configured and use as sensor subsystems 400 and 405 in a monitoring system, such as monitoring system 115 of FIG. 1, includes passive infrared detectors ("PIR"). PIRs are low cost and readily available sensing modules which monitor emission of infrared electromagnetic energy from objects. Optionally or additionally to opening 205 of FIG. 2, control panel assembly 140 may include one or more other attaching devices 410 and 415 at one or more locations suitable for connecting control panel assembly 140 with a leg hole device. Attaching devices 410 and 415 may be, for example, hook and loop fasteners, tapes, straps, magnets, clamps, springs or other fastening devices known in the art.

Figure 5:
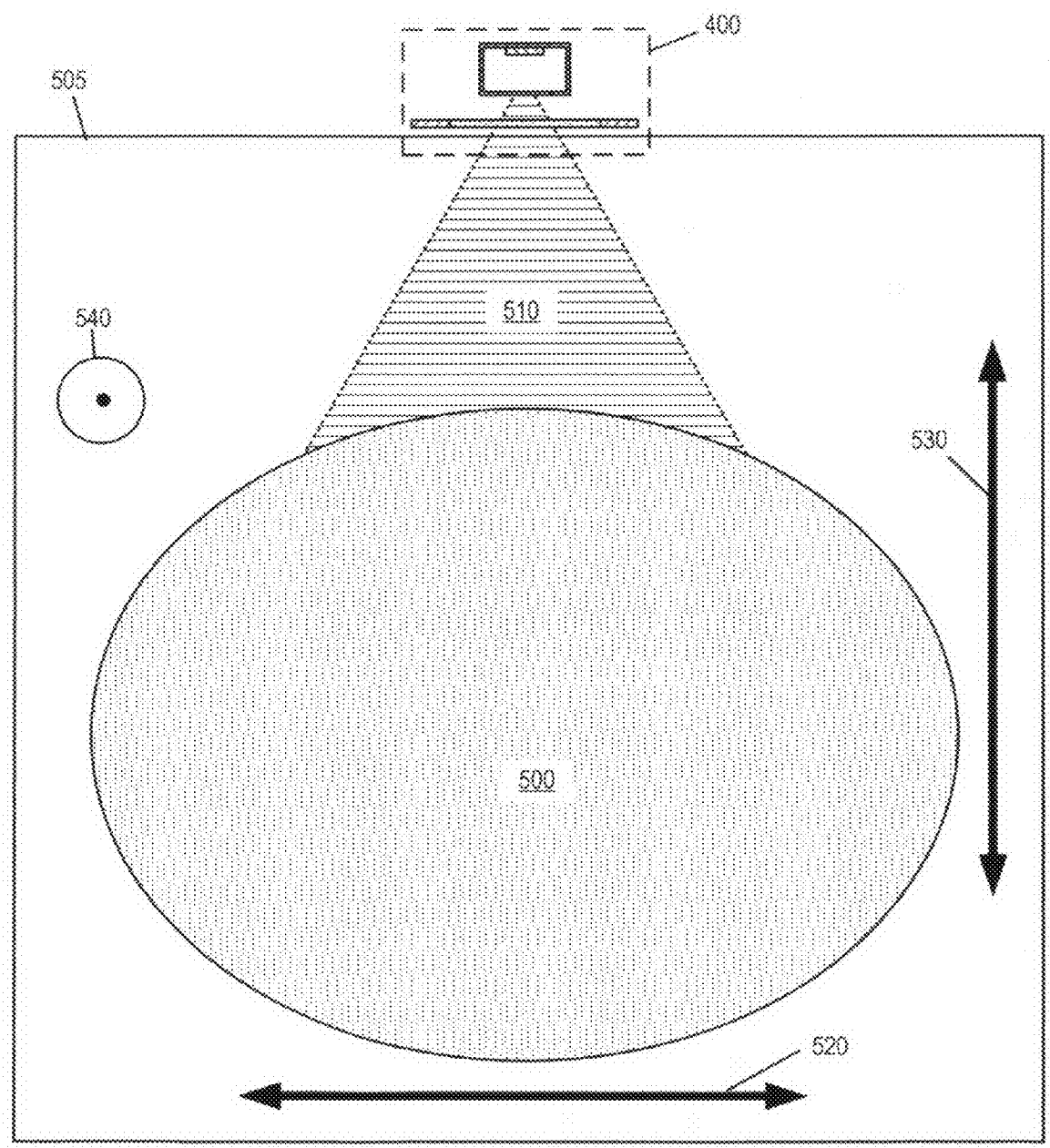
FIG. 5 is a cross-sectional view of a sensor subsystem and a leg of a child engaged with a LHD, in accordance with an embodiment.

FIG. 5 shows a cross-sectional view of sensor subsystem 400 and leg 500 of a child engaged with LHD 505. Sensor subsystem 400 monitors infrared electromagnetic energy 510 emitted from leg 500 to determine a state of absence or presence of leg 500 in LHD 505. As described below in association with FIGS. 6 and 7, sensor subsystem 400 may be designed and configured to have high sensitivity to absence or presence of leg 500 but low sensitivity to motions of leg 500 within LDH 505. Motions preferably with low sensitivity include motions 520 (e.g., side-to-side within a LHD) and 530 (e.g., up and down within a LHD) of leg 500 within LHD 505 which are indicated in FIG. 5 by heavy black arrows. Motion 540 (e.g., in and out of a LHD) of leg 500 normal to the shown cross-sectional view may be most often associated with the absence or presence of leg 500 and is indicated by an into-plane symbol. Motion 540 preferably is designed and configured for high sensitivity. Depending upon conditions, such as time of year and temperature, leg 500 may be bare, lightly clothed or heavily clothed. Sensor subsystem 400 may require adjustment or may include automatic adjustment of sensitivities to accommodate the amount of leg clothing. Additionally or optionally, sensor subsystem 400 may be paired with another sensor of a different type as discussed herein such as a capacitive sensor for conditions where the amount of clothing may be very heavy whereby insulating a leg and reducing the efficacy of a PIR sensor.

Figure 6:
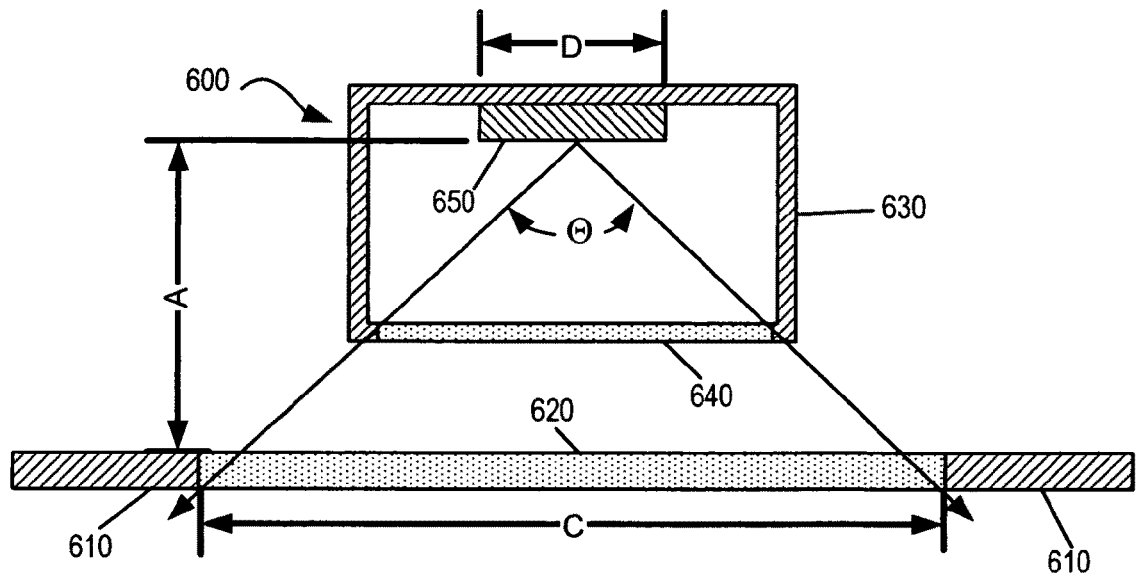
FIG. 6 is a partial cross-sectional view of control panel assembly 140 of FIG. 2 including details of a sensor subsystem, in accordance with an embodiment.
Figure 7:
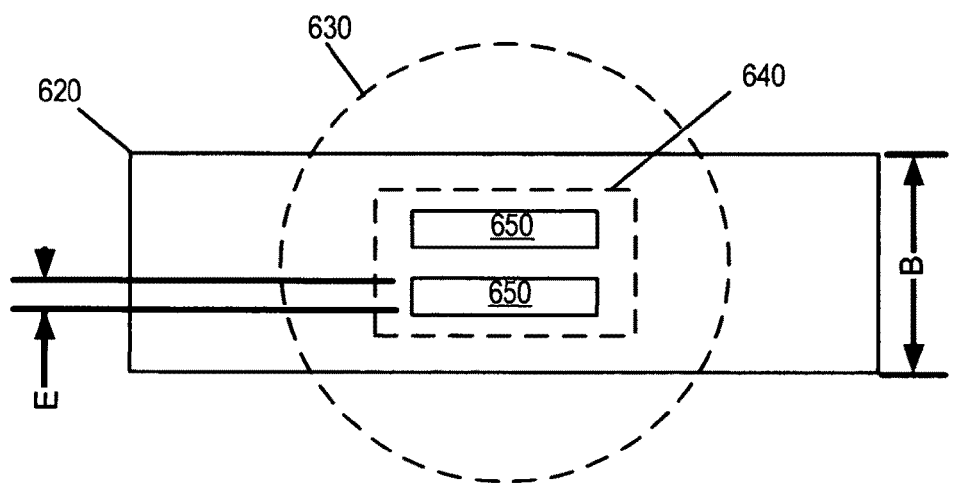
FIG. 7 is a partial bottom view of control panel assembly 140 of FIG. 2 including further details of a sensor subsystem, in accordance with an embodiment.

FIGS. 6 and 7 are a partial cross-sectional view and a partial bottom view, respectively, of a portion of housing 200 of control panel assembly 140 of FIG. 2 including details of sensor subsystem 400 of FIG. 4. A suitable sensor 600 for use with sensor subsystem 400 may be a pyroelectric passive infrared sensor, for example the SPS series (e.g., SPS125B) of pyroelectric sensors available from Fuji & Co. of Osaka Japan. Sensor 600 may be enclosed within housing 200 of control panel assembly 140 of FIG. 2. Sensor 600 may be mounted to or electrically connected with PCB 270 which itself may be enclosed within housing 200. Portions 610 of housing 200 of control panel assembly 140 may be formed from a plastic material for example, polystyrene which is opaque to IR radiation and therefore may act as an aperture. Portions 610 of housing 200 may also be formed of a metal such has aluminum. Another portion 620 of housing 200 may formed from a material, for example polyethylene which is transparent to IR electromagnetic energy and therefore forms a window usable by sensor 600. Portion 620 of housing 200 may incorporate a Fresnel lens or other optical element to modify the transmitted electromagnetic energy by focusing, defocusing or beam shaping. Use of a lens or other optical element may decrease or increase sensitivities to motions by altering cones of observation as discussed herein below. Sensor 600 may be available in a hermetically sealed case 630 which includes an IR transparent window 640 and one or more pyroelectric sensor elements 650. Suitable selection of materials for transmitting and blocking IR radiation may be performed by associating the desired sensing wavelength range (e.g., 4 to 20 microns), the detector response characteristics and the materials properties.

Sensitivities to movements of leg 500 in motions 520, 530 and 540 as shown in FIG. 5 may be configured by consideration of dimensions and parameters detailed in TABLE 1 below and indicated in FIGS. 6 and 7. Relatedly, reductions of interference from extraneous sources, such as a caregivers hand or other body part may be limited by definition of the cones of observation as described below.

TABLE 1

| Dimension | Value |
|---|---|
| A | Distance from pyroelectric sensor element 650 to IR transparent portion 620 of housing 200 |
| B | Dimension of short-axis of IR transparent portion 620 of housing 200 |
| C | Dimension of long-axis of IR transparent portion 620 of housing 200 |
| D | Dimension of long-axis of pyroelectric sensor element 650 |
| E | Dimension of short-axis of pyroelectric sensor element 650 |

To define a detection region which has low sensitivity to motions 520 and 530, the long-axis of IR transparent portion 620 of housing 200 as indicated by dimension "C" and the long-axis of pyroelectric sensor element 650 as indicated by dimension "D" may each be aligned normal to leg 500 of FIG. 5. Configured in this manner, sensor 600 detects IR electromagnetic energy from leg 500 within a large cone of observation $\Theta_{long}$ defined by EQN. 1 below regardless of motions 520 and 530 of leg 500. To define a detection region which has high sensitivity to motion 540, the short-axis of IR transparent portion 620 of housing 200 as indicated by dimension "B" and the short-axis of pyroelectric sensor element 650 as indicated by dimension "E" may each be aligned parallel to leg 500. Configured in this manner, sensor 600 detects IR electromagnetic energy from leg 500 within a small cone of observation $\Theta_{short}$ defined by EQN. 2 below from a narrow range of positions along motion 540.

Neglecting the size of the detector and assuming simple physical apertures and that IR transparent window 640 is not limiting, cones of observation may be defined by the following formulae:

$$\mathrm{Tan}\left(\frac{\theta_{long}}{2}\right) = \frac{C}{2A} \quad \text{EQN. 1}$$

$$\mathrm{Tan}\left(\frac{\theta_{short}}{2}\right) = \frac{B}{2A} \quad \text{EQN. 2}$$

PIR devices sense a difference in the level of IR electromagnetic energy between two or more pyroelectric sensor elements 650. A difference in the level of detected IR electromagnetic energy may indicate that an object such as leg 500 has moved, has been made present or has been made absent within a cone of observation of pyroelectric sensor element 650. When an object such as leg 500 is initially placed within cones of observation of pyroelectric sensor elements 650, a transient (different on each element) level of IR electromagnetic energy may be sensed. As an object such as leg 500 remains within the cones of observation of pyroelectric sensor elements 650, nearly equivalent or equilibrating levels of IR electromagnetic energy may be sensed on each pyroelectric sensor element 650. In this way leg 500 may be sensed when it is engaged and/or disengaged with a LHD and monitoring system such as shown in FIG. 1.

Figure 8:
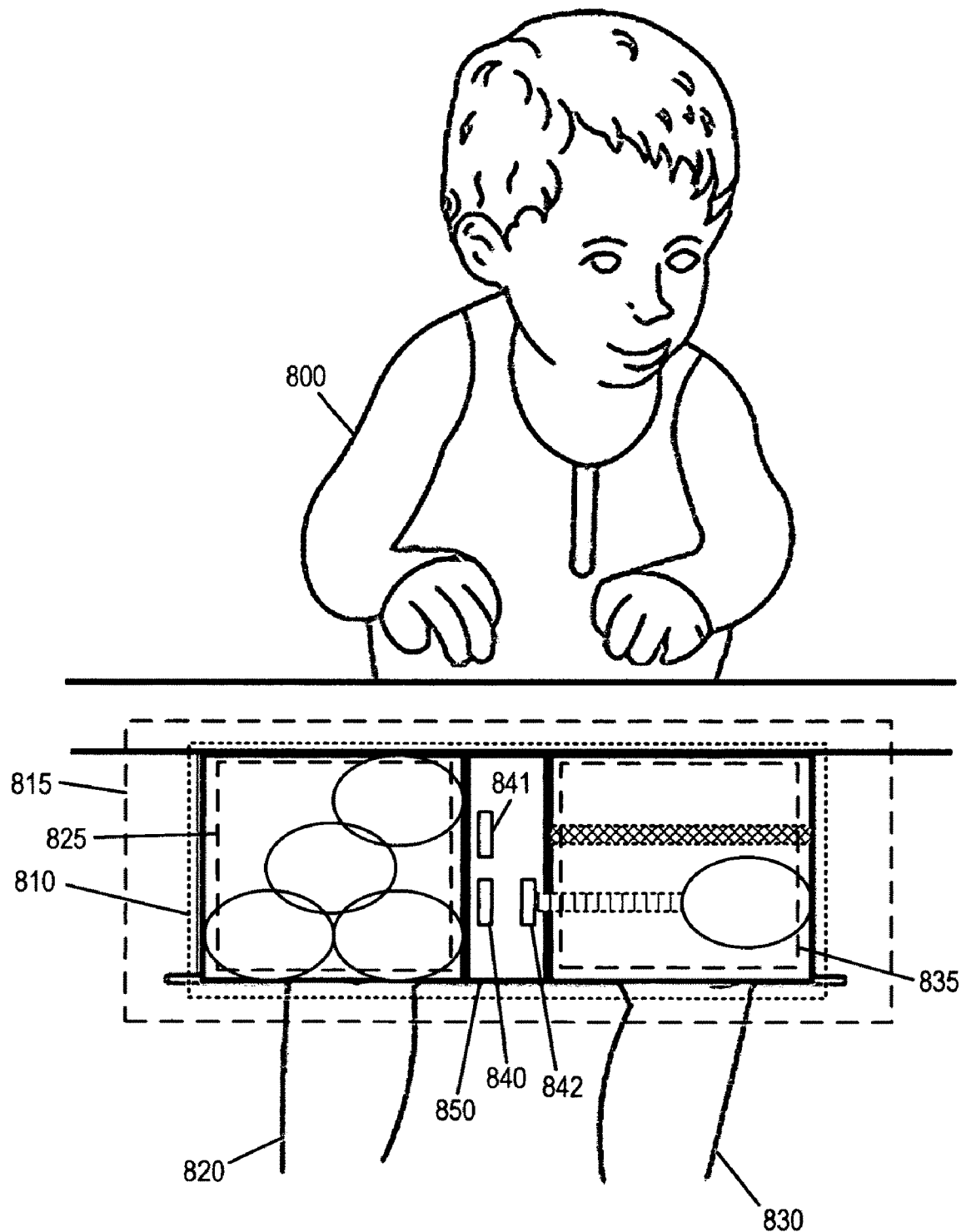
FIG. 8 is a front view of a child engaged with a LHD incorporating another monitoring system, in accordance with an embodiment.

FIG. 8 shows a front view of child 800 engaged with LHD 810 and monitoring system 815. LHD 810 may include one or more openings 825 and 835. Right leg 820 is engaged with opening 825 and left leg 830 is engaged with opening 835. Sensors 840, 841 and 842 may be mounted in or upon control panel assembly 850 which is shown positioned between right leg 820 and left leg 830. Optionally or additionally, sensors 840, 841 and 842 may be mounted above, below or about the sides of right leg 820 and left leg 830. Sensors 840, 841 and 842 may be, for example, active infrared distance sensors such as Sharp GP2D120 IR ranging sensors. Control panel assembly 850 may be connected with a portion of a LHD such as a movable encapsulation arm of a car seat, a molded seat of a highchair or a leg divider of a shopping cart. Although not shown in FIG. 8, control panel assembly 850 may include a plurality of controls, buttons, indicators and other features which define a user interface such as discussed above in association with FIG. 2. Additionally or optionally, a user interface may be remote from control panel assembly 850 on a remote device such as remote 300 of FIG. 3 discussed above.

Figure 9:
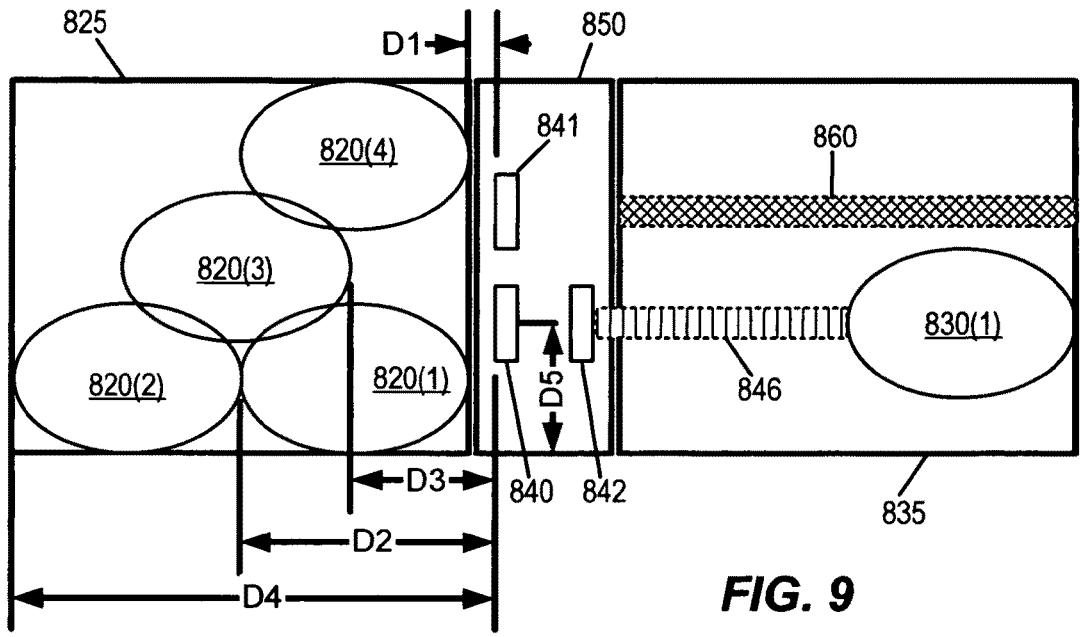
FIG. 9 is an enlarged view of the monitoring system and a portion the LHD of FIG. 8, in accordance with an embodiment.

FIG. 9 shows an enlarged view of a portion of FIG. 8 showing further details of monitoring system 815. Right leg 820 of FIG. 8 may be positioned at any number of locations 820(1), 820(2), 820(3) and 820(4) within opening 825 of LHD 810. At each location, a sensor such as sensor 840 may detect or not detect leg 820 and provide an output which is an indication of a distance between sensor 840 and leg 820. Senor 842 may be included in monitoring system 815 for detecting the presence or absence of leg 830 within opening 835.

Figure 10:
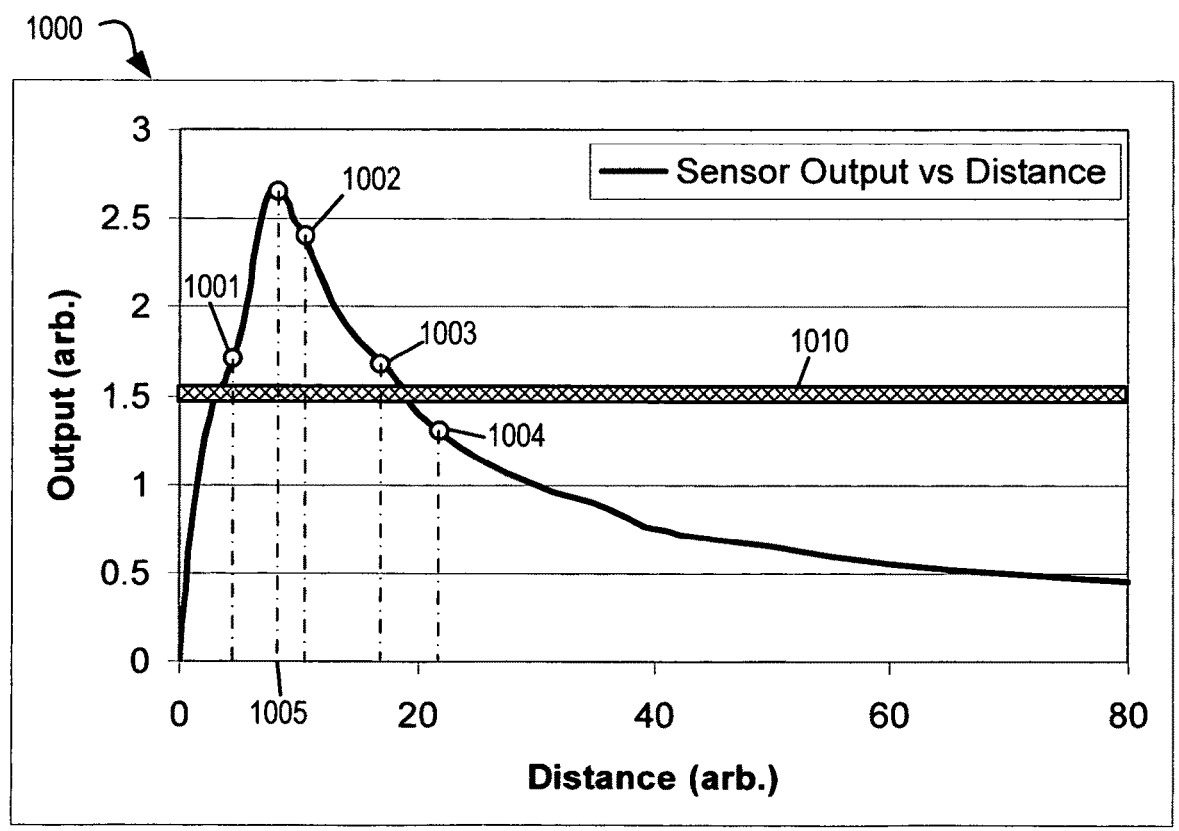
FIG. 10 is a plot of sensor output versus sensor-to-leg distance, in accordance with an embodiment.

Active infrared distance sensors such as sensor 842 operate by transmitting a beam 846 of IR electromagnetic energy toward an object, such a leg 830 at location 830(1), and detecting a reflected signal. FIG. 10 shows a plot 1000 of sensor output versus sensor-to-leg distance. TABLE 2 below lists associated leg locations, sensor-to-leg distances and sensor outputs.

TABLE 2

| Leg Location | Distance | Output |
|---|---|---|
| 820(1) | D1 | 1001 |
| 820(2) | D2 | 1002 |
| 820(3) | D3 | 1003 |
| 820(4) | D4 | 1004 |

Although active infrared distance sensors such as Sharp GP2D120 IR ranging sensors provide an output which is related to the sensor-to-object distance; the addition of a thresholding circuit or algorithm may convert the output into a state detection of leg absent or leg present. Thresholding may be based upon a fixed or adjustable threshold level 1010 which may also include a "deadband" region of output values.

At leg location 820(1), leg 820 is most proximate to sensor 840 and although distance D1 is below the minimum specified measurable distance 1005, associated output 1001 is above threshold level 1010 and therefore leg 820 is detected as present in opening 825 of LHD 810. At leg location 820(2), leg 820 may be located proximate an opposite side of opening 825 from sensor 840 at a distance D2. Sensor 840, detecting leg 820 at location 820(2) provides output 1002 which being above threshold level 1010 indicates that leg 820 is detected as present. At leg location 820(3), leg 820 may be generally located near the center of opening 825 at distance D3 from sensor 840. Although leg 820 at location 820(3) may not be in the direct line of sight of sensor 840, leg 820 may be detected as present and output 1003 may be provided. At leg location 820(4), leg 820 may not be detected by sensor 840. In this case, sensor 840 may detect an opposite surface at distance D4 from sensor 840 of opening 825 of LHD 810 therefore sensor 840 provides output 1004 which is below threshold level 1010 and the leg state is detected as not present. Furthermore, if an opposite surface of opening 825 is not detected, sensor 840 may return an output indicating that no leg is detected.

Sensor 840 may be located a distance D5 from the "bottom" of opening 825 of LHD 810. Distance D5 may be chosen by analysis of the lines of sight of sensor 840 and a statistical distribution of diameter of leg 820. The addition of an additional sensor 841 associated with opening 825 may provide for extended range of "vertical" locations being sensed. Sensor 841 may be positioned in vertical alignment with sensor 840 and therefore may be able to detect leg 820 at leg location 820(4) as present. Sensor 841 when combined with sensor 840 may also provide redundant or higher fidelity detection of leg 820 at locations such as leg location 820(3) which may not be in the direct line of sight of either sensor 840 or 841. Although shown in FIG. 9 as directly opposed, sensors 840 and 842 for sensing openings 825 and 835 respectively, may be staggered or offset with respect to each other to minimize the dimension of control panel assembly 850 between legs 820 and 830.

As an alternative to the inclusion of second sensor 841, physical barrier 860 may be added to limit the range of vertical locations available to a leg. As shown in FIG. 9, barrier 860 is associated with opening 835 and leg 830 but it may also be associated with opening 825 and leg 820 either as a single barrier 860 extending across both openings or with the addition of a second barrier independent of barrier 860. The addition of barrier 860 may be used when retrofitting current LHDs which were not designed in consideration of monitoring system 815.

Figure 11:
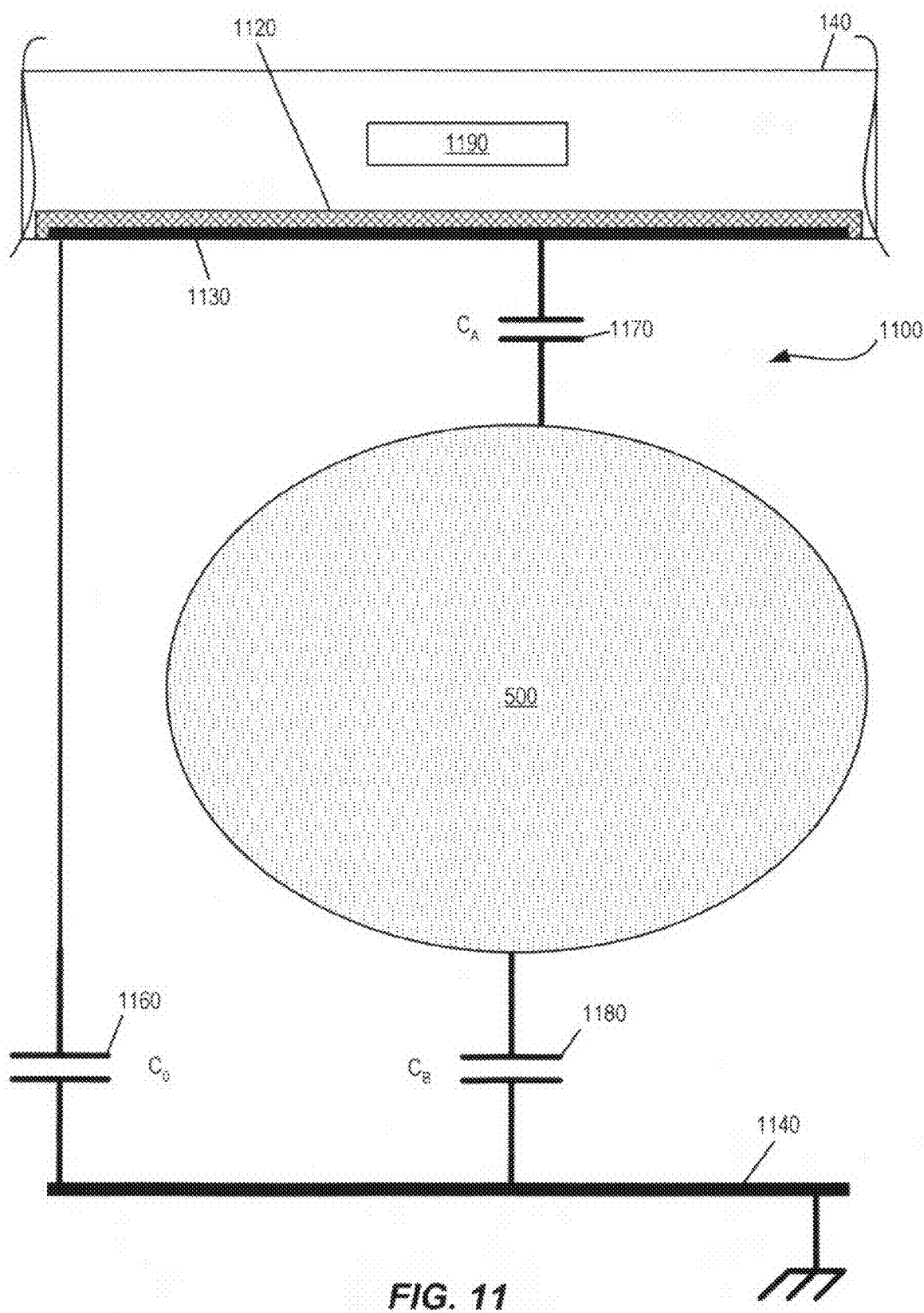
FIG. 11 is a combined cross-sectional view and electrical schematic of a capacitively sensed monitoring system, in accordance with an embodiment.

FIG. 11 shows a combined cross-sectional view and electrical schematic of capacitively sensed monitoring system 1100 including a portion of control panel assembly 140 of FIG. 1 and further including capacitive sensing elements 1120, 1130 and 1140 as well as leg 500 of a child engaged with a LHD such as LHD 505 of FIG. 5. Capacitive sensing element 1120 is a driven shield. Capacitive sensing element 1130 is a sense electrode. Capacitive sensing element 1140 is a reference or "ground" electrode. Capacitive sensing elements 1120, 1130 and 1140 may be formed of a metal or other electrically conductive material or coating. Capacitive sensing elements 1120 and 1130 may be formed within or onto a surface of control panel assembly 140. Capacitive sensing element 1140 may be formed from an existing metal or conductive portion of a LHD. For example, for a metal shopping cart, the frame and seat portions (e.g., laterally-oriented seat portion 114 of FIG. 1) of the cart may act as the reference or "ground" electrode. Alternatively a metal or conductive component may be added to the LHD to provide this electrode. For example, for a plastic highchair, a metal or conductive mat, strip or liner may be placed on a side of a leg opposite to capacitive sensing element 1130 where the legs go through the leg holes or beside the leg holes. Capacitive sensing element 1120 may not be required in environment where stray electrical fields are not an issue or in environments where little metal is present. For example, capacitive sensing element 1120 may be used to improve signal strength with a monitoring device used with a metal shopping cart or to avoid interference from metal dinnerware or utensils when used with a plastic highchair.

Monitoring system 1100 operates by detecting a change in capacitance when leg 500 is present or absent. When leg 500 is absent from monitoring system 1100, the circuit capacitance may be defined as $C_0$ and the system is electrically modeled as single capacitor 1160. When leg 500 is present within monitoring system 1100, the circuit capacitance may be defined as $C_0$ in parallel with a series capacitors 1170 and 1180 defined as $C_A$ (sense electrode-to-leg) and $C_B$ (leg-to-reference electrode). The system capacitance with a leg present is electrically modeled as:

$$C = C_0 + \frac{C_A C_B}{C_A + C_B} \qquad \text{EQN. 3}$$

Suitable circuitry and electronics 1190 may be included with control panel assembly 140 for sensing the different values of the system capacitance and providing indications such as described above in association with FIG. 2. Circuits and electronics for this type of detection are known in the art. One example may be see in AIP Handbook of Modern Sensors by Jacob Fraden page 319.

Figure 12:
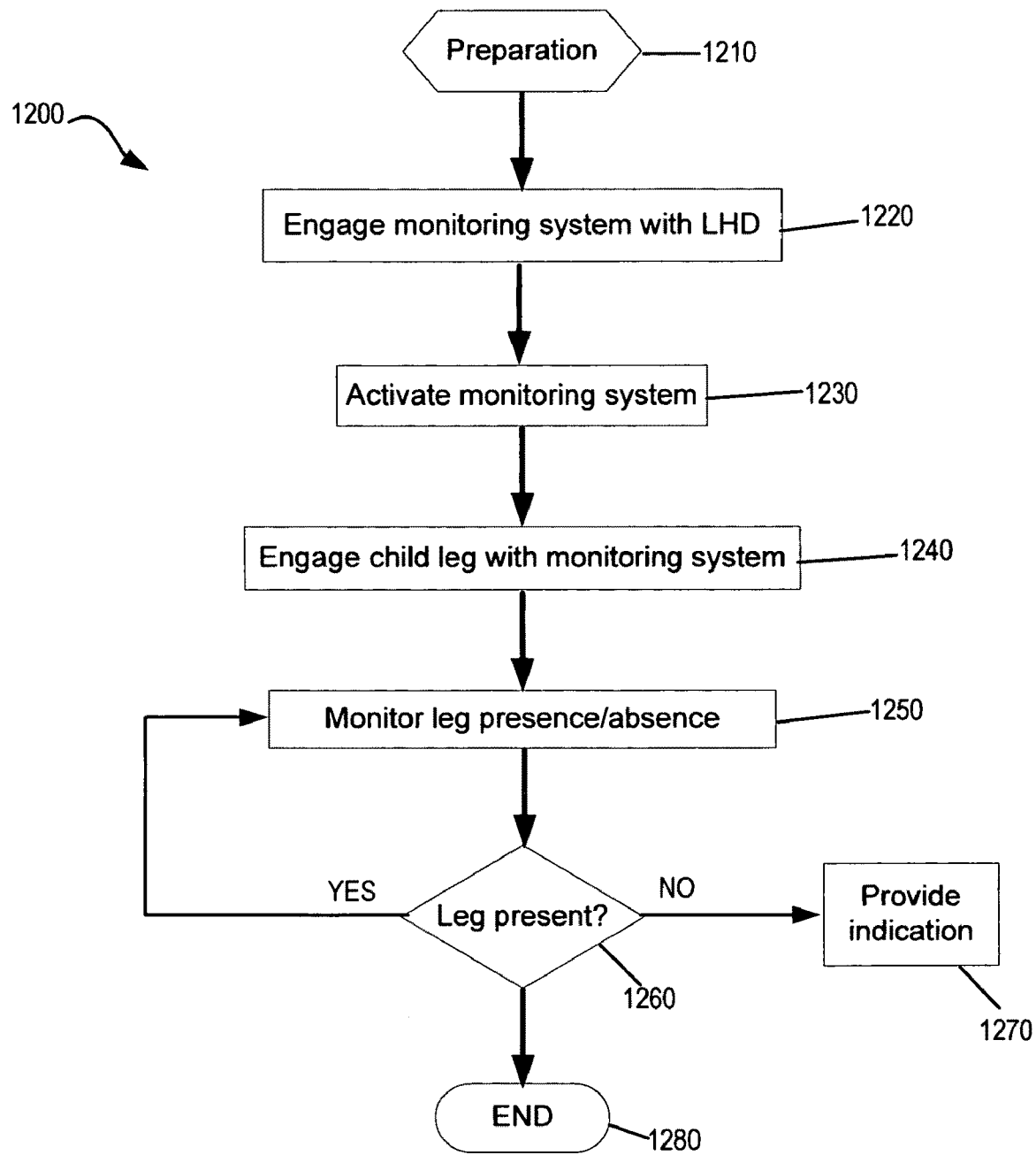
FIG. 12 is a flowchart of an exemplary set of steps performed during the use of a monitoring system, in accordance with an embodiment.

FIG. 12 shows a flowchart of an exemplary set of steps for a process 1200 of use of a monitoring system such as monitoring system 115 of FIG. 1 or monitoring system 815 of FIG. 8. Process 1200 begins with preparation step 1210 wherein any necessary or desired setup, configuration, supply and/or transport of a monitoring system is performed. Additionally or optionally power to a monitoring system may be supplied during step 1210 such as by activating a power switch or supplying external power to a monitoring system via a power cable. For example, if a monitoring system is transported to an LHD (e.g., going to a store where a shopping cart will be used as an LHD), a monitoring system may be turned off during transport and repowered after being secured to the shopping cart. Process 1200, next advances to step 1220 wherein a monitoring system may be engaged with a LHD. For example, a monitoring system may be connected with a shopping cart using magnets or hook-and-loop fasteners. For a monitoring system which is integrated with a LHD, step 1220 may not be performed. For a monitoring system which is integrated with an accessory for a LHD, the accessory itself may be engaged with a LHD whereby engaging the monitoring system with the LHD.

Next, in step 1230 the monitoring system may be activated. If a monitoring system is integrated with or is installed for a period of time in a LHD, a monitoring system may remain in a quiescent mode while a LHD is not in use. Subsequently a monitoring system may self activate upon being connected with a LHD or upon sensing of a leg of a child. Optionally or additionally, a monitoring system may self calibrate or configure its sensitivities after attachment to a LHD by sensing local conditions prior to the engagement of a child to the monitoring system and the LHD. Next in step 1240, a child's leg is engaged with a monitoring system and the monitoring system may signify this with an audible, visual, vibratory or other indication on the monitoring system or from a remote device. Different indications may be used to signify the presence/absence of one leg vs. two legs, a state or readiness or a state of error. A user may be able to "program" or configure a monitoring system to provide a desired indication. Default indications, which may be provided when exiting or entering a quiescent mode, may be overridden and/or changed by a user to his/her desired indications. Although convenient to perform during preparation step 1210 and/or activation step 1230, programming or configuration of a monitoring system may be performed during any step of process 1200.

At step 1250, a monitoring system may enter into a monitoring loop to detect presence or absence of one or both of the child's legs. In step 1260, a decision is made based upon data generated during monitoring step 1250 as to whether a leg is present or absent. If a leg is present "YES", then process 1200 returns to step 1250. The monitoring system may optionally also provide a low intensity indication to signify a "safe" state. If a leg is not present "NO", process 1200 advances to a step 1270 and an indication of the state monitored is provided. For example, if one leg is determined to be absent and the other leg is determined to be present this state may signify that a child is beginning to attempt to stand in the LHD. In this instance a medium intensity indication may be provided. Additionally, if the monitoring system determines that both legs are absent then it may provide a high intensity indication to signify a state of possible "danger." Additional indications may be provided if, for example, a child is rapidly moving his or her legs and "kicking" or performing other undesirable or dangerous actions that may be detectable as either time-based, frequency-based or position-based monitored and collected data. Processing of any or all of the abovementioned indications may be provided by a microprocessor such as microprocessor 260 of FIG. 2. Upon termination of monitoring by disabling the monitoring system, removal of the child or other actions, process 1200 terminates with a step 1280.

The changes described above, and others, may be made in the monitoring systems described herein without departing from the scope hereof. For example, although certain examples are described in association with a shopping cart, it may be understood that the monitoring systems described herein may be adapted to strollers, car seats, child swings or other leg hole devices. Additionally, although certain embodiments are described herein in association with passive and active infrared and capacitive sensor systems, it may be understood that the monitoring systems described herein may include one or more of the following types of sensors, either of the same type or different: radio frequency, capacitive, acoustic (detection of sound), photoelectric (interruption of light beams, through beam and/or reflective), optoelectric (detection of varied illumination or optical contrast), active infrared, passive infrared ("PIR"), fiberoptic, electric field imaging sensors such as the MC33794 proximity sensor from Motorola, electrostatic ultrasonic transducers such as the Mini-A series from SensComp, video motion detection, laser scanning and/or any other sensor type known in the art or hereinafter developed. Multiple sensors, of the same or different types as those mentioned above, may also be used to complementarily monitor a leg. For example, two PIR sensors, one positioned between the legs and another positioned laterally to a right leg may both monitor the right leg and may therefore provide enhanced monitoring of the right leg. For more details regarding optional sensors, see, for example, AIP Handbook of Modern Sensors by Jacob Fraden, and portions of the text are included herein by reference. Furthermore, although discussed in relation to common consumer-based LHDs, it may be understand that the monitoring systems described herein may be applied to systems such as rides for children at amusement parks. In this example, more than one child may be present and require monitoring and the caregiver associated with a child in a shopping cart or highchair is exchanged for the operator of the ride and is responsible for the safety of the children. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A monitoring system for use with a leg hole device, the monitoring system comprising a first sensor for monitoring a state of at least one leg of a child engaged with said leg hole device, a control system coupled with said first sensor and a user interface for configuring said monitoring system operably coupled with said control system wherein the state of the at least one leg is selected from the group consisting of the presence of said leg engaged with said leg hole device, and the absence of said leg engaged with said leg hole device.

2. The monitoring system of claim 1, wherein said first sensor is selected from the group consisting of radio frequency sensors, active infrared sensors, passive infrared sensors, capacitive sensors, acoustic sensors, photoelectric sensors, fiberoptic sensors, electric field imaging sensors, ultrasonic transducers and optoelectronic sensors.

3. The monitoring system of claim 1, further comprising a second sensor coupled with said control system wherein said second sensor is selected from the group consisting of radio frequency sensors, active infrared sensors, passive infrared sensors, capacitive sensors, acoustic sensors, photoelectric sensors, fiberoptic sensors, electric field imaging sensors, ultrasonic transducers and optoelectronic sensors.

4. The monitoring system of claim 1, wherein said control system is a passive control system.

5. The monitoring system of claim 1, wherein said control system is an interactive control system.

6. The monitoring system of claim 1, further comprising means for presenting an indication of said state.

7. The monitoring system of claim 6, wherein said indication is selected from the group consisting of audible indications, visual indications, vibratory indications, mechanical indications, electrical indications, radio-transmitted indications and remote indications.

8. The monitoring system of claim 1, wherein said user interface is remote from said sensor and said control system.

9. The monitoring system of claim 8, wherein said user interface comprises a housing, an RF transmitter/receiver, a power source, a control button and an indicator.

10. The monitoring system of claim 1, further comprising means for attaching said monitoring system to said leg hole device.

11. The monitoring system of claim 10, wherein said attaching means is selected from the group consisting of hook-and-loop fasteners, straps, tapes, threaded fasteners, springs, clamps and magnets.

12. The monitoring system of claim 1, wherein said monitoring system is integrally formed with at least a portion of said leg hole device.

13. The monitoring system of claim 1, wherein said monitoring system integrally formed with an accessory for said leg hole device.

14. A method for monitoring a child engaged with a leg hole device comprising activating a monitoring system, monitoring a state of at least one leg of said child and providing an indication of said state of said at least one leg of said child wherein the state of the at least one leg is selected from the group consisting of the presence of said leg engaged with said leg hole device, and the absence of said leg engaged with said leg hole device.

15. The method of claim 14, wherein said monitoring system is self-activating.

16. The method of claim 14, further comprising engaging said monitoring system with said leg hole device.

17. The method of claim 14, wherein said monitoring system is integrally formed with an accessory for said leg hole device.

18. A monitoring system for use with a leg hole device, the monitoring system comprising an infrared sensor for monitoring a state of at least one leg of a child engaged with said leg hole device, a control system electrically coupled to said sensor and at least one control for configuring said monitoring system operably coupled with said control system.

* * * * *